US012784116B2

(12) United States Patent
Kim

(10) Patent No.: US 12,784,116 B2
(45) Date of Patent: Nov. 3, 2026

(54) APPARATUS FOR CONTROLLING ROBOT AND METHOD THEREOF

(71) Applicants: Hyundai Motor Company, Seoul (KR); Kia Corporation, Seoul (KR)

(72) Inventor: Bo Ram Kim, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 128 days.

(21) Appl. No.: 18/794,249

(22) Filed: Aug. 5, 2024

(65) Prior Publication Data

US 2025/0307961 A1 Oct. 2, 2025

(30) Foreign Application Priority Data

Mar. 29, 2024 (KR) ........................ 10-2024-0043456

(51) Int. Cl.

*G06Q 50/10* (2012.01)
*G10L 15/00* (2013.01)
*G10L 15/02* (2006.01)
*G10L 15/08* (2006.01)

(52) U.S. Cl.

CPC ............ *G06Q 50/10* (2013.01); *G10L 15/005* (2013.01); *G10L 15/02* (2013.01); *G10L 2015/088* (2013.01)

(58) Field of Classification Search

CPC ....... G06Q 50/10; G10L 15/005; G10L 15/02; G10L 15/08; G10L 2015/088; G06F 40/247; G06F 40/284; G06F 40/30; G06F 40/47; G06F 40/205; G06F 40/58; G06F 16/31; G06F 16/3329; G06F 16/3334; G06F 16/3335; G06F 16/3347; G06F 18/21355; B25J 9/1602; B25J 9/163; B25J 11/008

USPC ............. 700/246; 704/2, 8, 275, 9; 709/206; 705/7.13, 7.25, 7.31; 707/688; 706/21

See application file for complete search history.

(56) References Cited

U.S. PATENT DOCUMENTS

| | | | | |
|---|---|---|---|---|
| 2005/0054381 | A1 | 3/2005 | Lee et al. | |
| 2013/0115578 | A1* | 5/2013 | Shiina | G09B 21/009 |
| 2016/0164815 | A1* | 6/2016 | Cho | G06F 40/30 |
| 2016/0357854 | A1* | 12/2016 | Hashimoto | G06F 16/3329 |
| 2018/0085928 | A1* | 3/2018 | Yamato | G06F 40/30 |
| 2019/0163985 | A1* | 5/2019 | Wang | G06Q 30/00 |
| 2019/0236155 | A1* | 8/2019 | Bachrach | G06N 3/0442 |

(Continued)

FOREIGN PATENT DOCUMENTS

| | | | | |
|---|---|---|---|---|
| CN | 109408622 A | * | 3/2019 | G06F 40/295 |
| JP | 2023018893 A | | 2/2023 | |

(Continued)

*Primary Examiner* — Ellis B. Ramirez
(74) *Attorney, Agent, or Firm* — Slater Matsil, LLP

(57) ABSTRACT

A robot control apparatus can include a memory that stores computer-executable instructions, and at least one processor that executes the instructions by accessing the memory. The at least one processor can obtain a feature vector for providing a service to a user according to an input sentence based on identifying the input sentence including requirements of the user, obtain a score of a candidate vector based on the feature vector and the candidate vector stored in a database, and provide a target service, which is paired with a target vector and which is a service according to the input sentence, based on the target vector being determined through the score of the candidate vector.

20 Claims, 7 Drawing Sheets

(56) References Cited

U.S. PATENT DOCUMENTS

| | | | | |
|---|---|---|---|---|
| 2024/0265200 | A1* | 8/2024 | Torisawa | G06F 40/20 |
| 2024/0412720 | A1* | 12/2024 | Vasylyev | G06F 16/90332 |

FOREIGN PATENT DOCUMENTS

| | | | |
|---|---|---|---|
| KR | 20060101449 | A | 9/2006 |
| KR | 20180017342 | A | 2/2018 |
| KR | 20190109703 | A | 9/2019 |

* cited by examiner

APPARATUS FOR CONTROLLING ROBOT AND METHOD THEREOF

CROSS-REFERENCE TO RELATED APPLICATIONS

This application claims the benefit of priority to Korean Patent Application No. 10-2024-0043456, filed in the Korean Intellectual Property Office on Mar. 29, 2024, the entire contents of which are incorporated herein by reference.

TECHNICAL FIELD

The present disclosure relates to a robot control apparatus and a control method thereof.

BACKGROUND

In general, when a user wishes to purchase or manage a vehicle, the user may visit repair shops or exhibition halls such as vehicle sales dealerships and/or motor studio and then may determine what the user is interested in. In detail, a service robot may provide the user with guidance on an object of interest.

However, the service robot provides the user with guidance including mostly general and standardized content. In addition, whenever receiving new information, the service robot needs to set a new classification policy to store the new information in a database.

Due to this operation of the service robot, users may waste time and may lose interest through uniformly classified guidance. Moreover, providers who provide the guidance through the service robot may set the new classification policy in the database to manage the new information, thereby reducing cost-effectiveness.

To solve these issues, there is a need to develop a technology provided to a user through personalized guidance and a technology for managing data by using a standardized policy in the databases.

SUMMARY

An embodiment of the present disclosure can solve the above-mentioned problems occurring in the prior art while advantages achieved by the prior art are maintained intact.

An embodiment of the present disclosure provides a robot control apparatus that may provide a user with personalized guidance and may increase the user's convenience by providing a target service through a target vector determined from an input sentence including the user's requirements, and a control method thereof.

An embodiment of the present disclosure provides a robot control apparatus that may increase the accuracy of an operation of providing the user with personalized guidance by translating the language of an input sentence into a target language based on the fact that the language of the input sentence is not a predetermined target language, and a control method thereof.

An embodiment of the present disclosure provides a robot control apparatus that may manage data through a standardized policy in a database by determining a candidate vector of a sentence including a token based on a first frequency value of the token and a second frequency value of the token, which are obtained from a corpus, and a control method thereof.

Technical problems to be solved by an embodiment of the present disclosure are not limited to the aforementioned problems, and solutions to other technical problems not mentioned herein can be clearly understood from the following description by those skilled in the art to which the present disclosure pertains.

According to an embodiment of the present disclosure, a robot control apparatus may include a memory that stores computer-executable instructions, and at least one processor that executes the instructions by accessing the memory. The at least one processor may obtain a feature vector for providing a service according to an input sentence to a user from the input sentence based on identifying the input sentence including requirements of the user, may obtain a score of a candidate vector based on the feature vector and the candidate vector stored in a selected, set, or predetermined database, and may provide a target service, which is paired with a target vector and which is a service according to the input sentence, based on the target vector being determined through the score of the candidate vector.

In an embodiment, the at least one processor may translate a language of the input sentence by translating the language of the input sentence into a target language based on the language of the input sentence not being the predetermined target language, may obtain at least one keyword from the input sentence by removing a stopword of the input sentence, and may obtain a target keyword of the input sentence from a first service table based on the at least one keyword and the first service table regarding synonyms mapping.

In an embodiment, the at least one processor may obtain a guidance sentence corresponding to the target keyword based on a second service table regarding service mapping, and may obtain the feature vector by applying the guidance sentence to a feature extraction model trained to extract a feature of a sentence.

In an embodiment, the at least one processor may obtain a token by performing word-tokenization from a corpus including documents including at least one sentence, may determine a first frequency value of the token regarding a term frequency, at which the token is included in the corpus, based on the corpus, may determine a second frequency value of the token regarding an inverse document frequency, at which the token is included in the documents, based on the corpus, may determine a target weight of the token based on the first frequency value and the second frequency value, and may determine the candidate vector of a sentence including the token based on the target weight of the token.

In an embodiment, the at least one processor may obtain the score of the candidate vector by applying the feature vector and the candidate vector to a score calculation model, which is trained to extract a score related to similarity based on Euclidean scalar product.

In an embodiment, the at least one processor may identify at least one vector from the database in which the candidate vector is stored, may obtain a score of the at least one vector based on the feature vector and the at least one vector, and may determine the target vector based on the score of the at least one vector and a selected, set, or predetermined score.

In an embodiment, the at least one processor may determine an output vector group, which exceeds a selected, set, or predetermined score and which includes the target vector, by comparing the score of the at least one vector with the selected, set, or predetermined score, and may provide a service paired with each vector included in the output vector group.

In an embodiment, the at least one processor may obtain an additional feature vector from an additional input sentence based on identifying the additional input sentence including additional requirements of the user after identifying the input sentence, may obtain the score of the candidate vector based on the additional feature vector and the candidate vector, and may provide a service, which is paired with the target vector and which is according to the additional input sentence, based on the target vector being determined through the score of the candidate vector.

In an embodiment, the at least one processor may store a service, which is paired with the feature vector and which is according to the input sentence, in the database by pairing the service according to the input sentence with the feature vector.

According to an embodiment of the present disclosure, a robot control method may include obtaining a feature vector for providing a service according to an input sentence to a user from the input sentence based on identifying the input sentence including requirements of the user, obtaining a score of a candidate vector based on the feature vector and the candidate vector stored in a selected, set, or predetermined database, and providing a target service, which is paired with a target vector and which is a service according to the input sentence, based on the target vector being determined through the score of the candidate vector.

In an embodiment, the obtaining of the feature vector may include translating a language of the input sentence by translating the language of the input sentence into a target language based on a fact that the language of the input sentence is not the predetermined target language, obtaining at least one keyword from the input sentence by removing a stopword of the input sentence, and obtaining a target keyword of the input sentence from a first service table based on the at least one keyword and the first service table regarding synonyms mapping.

In an embodiment, the obtaining of the feature vector may include obtaining a guidance sentence corresponding to the target keyword based on a second service table regarding service mapping, and obtaining the feature vector by applying the guidance sentence to a feature extraction model trained to extract a feature of a sentence.

In an embodiment, the obtaining of the score of the candidate vector may include obtaining a token by performing word-tokenization from a corpus including documents including at least one sentence, determining a first frequency value of the token regarding a term frequency, at which the token is included in the corpus, based on the corpus, determining a second frequency value of the token regarding an inverse document frequency, at which the token is included in the documents, based on the corpus, determining a target weight of the token based on the first frequency value and the second frequency value, and determining the candidate vector of a sentence including the token based on the target weight of the token.

In an embodiment, the obtaining of the score of the candidate vector may include obtaining the score of the candidate vector by applying the feature vector and the candidate vector to a score calculation model, which is trained to extract a score related to similarity based on Euclidean scalar product.

In an embodiment, the providing of the target service may include identifying at least one vector from the database in which the candidate vector is stored, obtaining a score of the at least one vector based on the feature vector and the at least one vector, and determining the target vector based on the score of the at least one vector and a selected, set, or predetermined score.

In an embodiment, the providing of the target service may include determining an output vector group, which exceeds a selected, set, or predetermined score and which includes the target vector, by comparing the score of the at least one vector with the selected, set, or predetermined score, and providing a service paired with each vector included in the output vector group.

In an embodiment, the providing of the target service may include obtaining an additional feature vector from an additional input sentence based on identifying the additional input sentence including additional requirements of the user after identifying the input sentence, obtaining the score of the candidate vector based on the additional feature vector and the candidate vector, and providing a service, which is paired with the target vector and which is according to the additional input sentence, based on the target vector being determined through the score of the candidate vector.

In an embodiment, the providing of the target service may include storing a service, which is paired with the feature vector and which is according to the input sentence, in the database by pairing the service according to the input sentence with the feature vector.

BRIEF DESCRIPTION OF THE DRAWINGS

The above and other features and advantages of the present disclosure can be more apparent from the following detailed description taken in conjunction with the accompanying drawings, in which.

Figure 1:
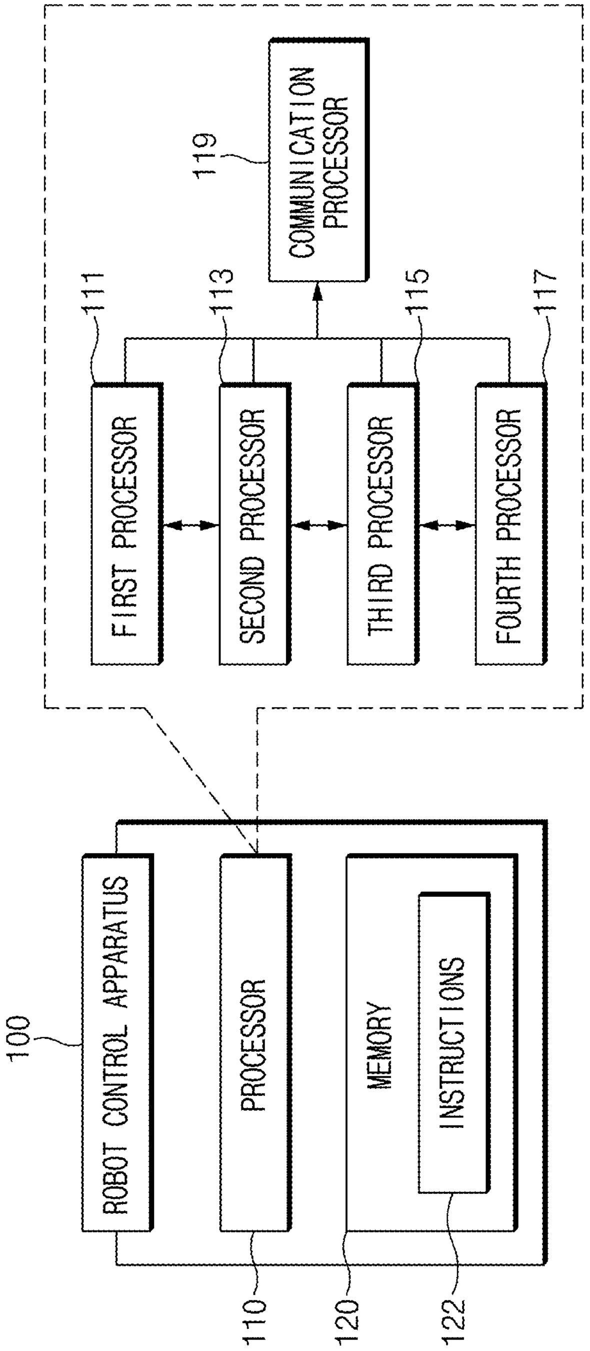
FIG. 1 is a diagram illustrating a robot control apparatus, according to an embodiment of the present disclosure.

With regard to description of drawings, same or similar components can be marked by same or similar reference signs.

DETAILED DESCRIPTION OF ILLUSTRATIVE EMBODIMENTS

Hereinafter, some example embodiments of the present disclosure will be described in detail with reference to the accompanying drawings. In adding reference numerals to components of each drawing, it can be noted that the same components include the same reference numerals, although they are indicated on another drawing. Furthermore, in describing the example embodiments of the present disclosure, detailed descriptions associated with well-known functions or configurations can be omitted when they may make subject matters of the present disclosure unnecessarily obscure. Hereinafter, various example embodiments of the present disclosure may be described with reference to accompanying drawings. Accordingly, those of ordinary skill in the art will recognize that modification, equivalent, and/or alternative on the various example embodiments described herein may be variously made without departing from the scopes and spirit of the present disclosure. With regard to description of drawings, similar components may be marked by similar reference numerals.

In describing elements of an embodiment of the present disclosure, the terms "first," "second," "A," "B," "(a)," "(b)," and the like, may be used herein. Such terms can be used merely to distinguish one element from another element, but do not limit the corresponding elements irrespective of the nature, order, or priority of the corresponding elements. Furthermore, unless otherwise defined, technical and scientific terms used herein can be interpreted as is customary in the art to which the present disclosure belongs. It can be understood that terms used herein can be interpreted as including a meaning that is consistent with their meaning in the context of the present disclosure and the relevant art and will not be interpreted in an idealized or overly formal sense unless expressly so defined herein. For example, the terms, such as "first," "second," and the like, used herein may refer to various components of various embodiments of the present disclosure, but do not limit the elements. For example, "a first user device" and "a second user device" may indicate different user devices regardless of the order or priority thereof. For example, without departing the scope of the present disclosure, a first complement may be referred to as a second component, and similarly, a second complement may be referred to as a first complement.

In this specification, the expressions "possess," "may possess," "include" and "comprise," or "may include" and "may comprise" used herein indicate existence of corresponding features (e.g., elements such as numeric values, functions, operations, or components) but do not exclude presence of additional features.

It can be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it can be understood that there are no intervening element (e.g., a third element).

According to the situation, the expression "configured to" used herein may be used as, for example, the expression "suitable for," "having the capacity to," "designed to," "adapted to," "made to," or "capable of."

The term "configured to" is not limited to only "specifically designed to" in hardware. Instead, the expression "a device configured to" may refer to the device being "capable of" operating together with another device or other components. For example, a "processor configured to (or set to) perform A, B, and C" may refer to a dedicated processor (e.g., an embedded processor) for performing a corresponding operation or a generic-purpose processor (e.g., a central processing unit (CPU) or an application processor) that performs corresponding operations by executing one or more software programs stored in a memory device. The terms used in the specification can be used merely to describe a specific embodiment and are not intended to necessarily limit the scopes of the present disclosure. The terms of a singular form may include plural forms unless otherwise specified. Technical or scientific terms may include a same meaning that is generally understood by a person skilled in the art. It can be further understood that terms that are defined in a dictionary and commonly used can also be interpreted as is customary in the relevant related art herein in various embodiments of the present disclosure. In some cases, even though terms are terms that are defined in the specification, they may not be interpreted to exclude embodiments of the present disclosure.

In the present disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included. Moreover, in describing a component of an embodiment of the present disclosure, the expressions at least one of "A or B," "at least one of A and B," "at least one of A or B," "A, B, or C," "at least one of A, B, and C," or "at least one of A, B, or C, or any combination thereof" may include any and all combinations of one or more of the associated listed items. In particular, expressions "at least one of A, B, or C, or any combination thereof" may include A, B, or C, or any combination thereof such as AB, ABC, or the like.

Hereinafter, example embodiments of the present disclosure will be described in detail with reference to FIGS. 1 to 7.

FIG. 1 is a diagram illustrating a robot control apparatus, according to an embodiment of the present disclosure.

According to an embodiment, a robot control apparatus 100 may include a processor 110 and a memory 120, including instructions 122, either or both of which may be in plural or may include plural components thereof.

The robot control apparatus 100 may represent a device that provides a personalized guidance service to a user (e.g., a visiting customer) through a robot located in a space, in which vehicle-related services are provided, such as a vehicle dealership.

For example, the robot control apparatus 100 may identify at least one of a voice including requirements from a user, or an input sentence including requirements, or any combination thereof. The robot control apparatus 100 may provide a target service to the user by performing at least one operation based on identifying at least one of the voice, or the input sentence, or any combination thereof. The target service may indicate a service based on at least one of the voice, or the input sentence, or any combination thereof. However, a method in which the robot control apparatus 100 provides a guidance menu to the user is not necessarily limited thereto. For example, the robot control apparatus 100 may provide the personalized guidance service directly to the user through an output device (e.g., a display or a speaker) without passing through a robot.

The processor 110 may execute software and may control at least one other component (e.g., a hardware or software component) connected to the processor 110. The processor 110 may also perform various data processing or operations. For example, the processor 110 may store at least one of the voice, the input sentence, or the target service, or any combination thereof in the memory 120.

For reference, the processor 110 may perform and/or control all operations performed by the robot control apparatus 100. Therefore, for convenience of description in this specification, an operation performed by the robot control apparatus 100 are mainly described as an operation performed by the processor 110. Furthermore, for convenience of description in this specification, the processor 110 is mainly described as a single processor, but is not limited thereto. For example, the robot control apparatus 100 may include at least one processor. The at least one processor may perform all operations related to an operation of providing the personalized guidance service.

For example, the processor 110 may include a first processor 111, a second processor 113, a third processor 115, a fourth processor 117, and a communication processor 119.

The first processor 111 may collect and/or identify user data (e.g., an input sentence) necessary to provide the personalized guidance service. For example, the first processor 111 may collect and/or identify user data input through a display mounted on the robot or the robot control apparatus 100.

The second processor 113 may determine data regarding the user's characteristics by analyzing the collected and/or identified user data. For example, the second processor 113 may extract features of user data through data analysis techniques (e.g., natural language processing techniques).

The third processor 115 may provide the personalized guidance service based on the features of user data extracted by the second processor 113. For example, the third processor 115 may provide a guidance service depending on the user's characteristics by utilizing the features of the extracted user data.

The fourth processor 117 may analyze or manage data for providing the personalized guidance service. For example, the fourth processor 117 may represent a processor that manages a database.

The communication processor 119 may receive user data necessary to provide the personalized guidance service. Moreover, the communication processor 119 may provide the user with the result calculated by operations of the first to fourth processors 111 to 117. For example, the communication processor 119 may support communication between the robot control apparatus 100 and the robot. For example, the communication processor 119 may include one or more components for communicating between the robot control apparatus 100 and the robot. For example, the communication processor 119 may include a short range wireless communication device, a microphone, or the like. Short-range communication technologies can include wireless LAN (Wi-Fi), Bluetooth, ZigBee, Wi-Fi Direct (WFD), ultra-wideband (UWB), infrared data association (IrDA), Bluetooth Low Energy (BLE), and near field communication (NFC), and the like, for example, but are not necessarily limited thereto.

The memory 120 may temporarily and/or permanently store various pieces of data and/or information required to perform an operation of providing the personalized guidance service. For example, the memory 120 may store at least one of the voice, the input sentence, or the target service, or any combination thereof.

Figure 2:
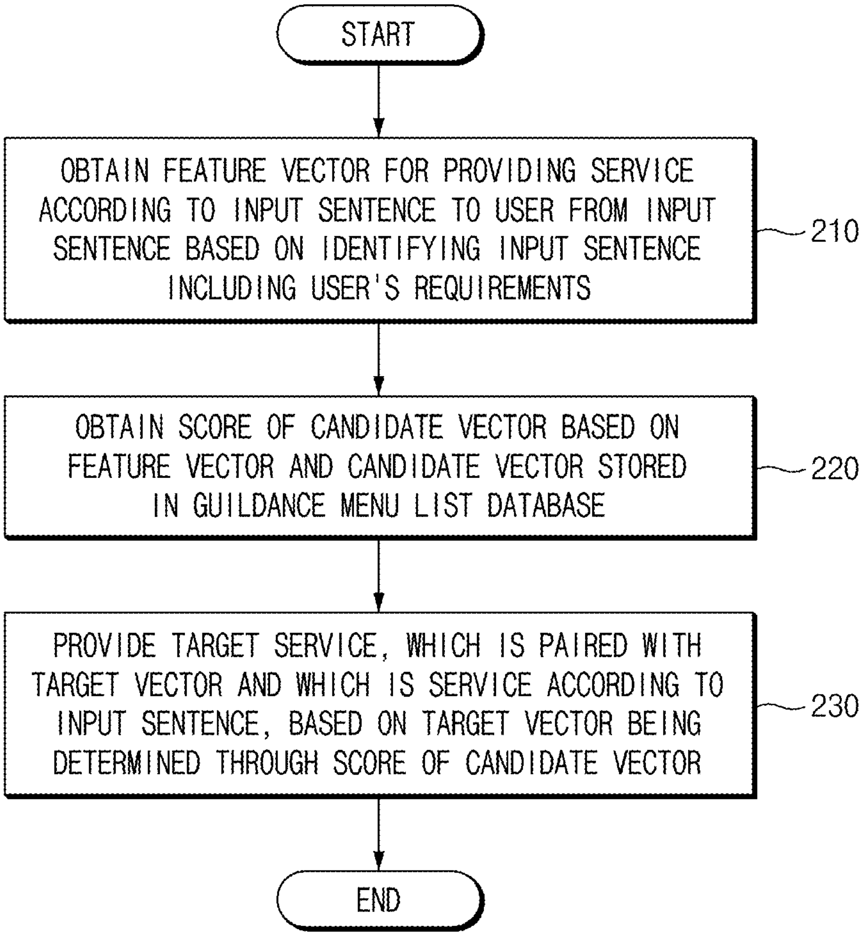
FIG. 2 is a flowchart for describing a method for controlling a robot, according to an embodiment of the present disclosure.

FIG. 2 is a flowchart for describing a method for controlling a robot, according to an embodiment of the present disclosure.

In operation 210, a robot control apparatus (e.g., the robot control apparatus 100 in FIG. 1) according to an embodiment may obtain a feature vector for providing a service according to an input sentence to a user from the input sentence based on identifying the input sentence including the user's requirements.

For example, the user's requirements may include a service (e.g., an exhibition hall guidance service, a vehicle description service, a maintenance status service, or a restroom guidance service) desired to be output from a robot. A feature vector may indicate a vector including the selected, set, or predetermined dimension with unique characteristics and properties of the input sentence. After identifying the input sentence, the robot control apparatus may obtain the feature vector from a feature extraction model. A detailed description thereof is described later in FIG. 3 below.

In operation 220, the robot control apparatus may obtain the score of a candidate vector based on the feature vector and the candidate vector stored in a selected, set, or predetermined database.

For example, the robot control apparatus may identify the candidate vector stored in the selected, set, or predetermined database. The candidate vector may indicate a vector, from which a feature of a sentence different from that of the input sentence is extracted, before a point in time when the input sentence is identified. The robot control apparatus may compare the feature vector with the candidate vector. The robot control apparatus may obtain the score of the candidate vector by comparing the feature vector with the candidate vector. The detailed method for obtaining the score of the candidate vector is described later in FIG. 3 below.

In operation 230, the robot control apparatus may provide a target service, which is paired with the target vector and which is a service according to the input sentence, based on the target vector being determined through the score of the candidate vector.

For example, the robot control apparatus may determine the candidate vector as the target vector based on whether the score of the candidate vector exceeds the selected, set, or predetermined score (e.g., threshold score). The robot control apparatus may provide the target service to the user through the robot based on the candidate vector being determined as the target vector.

In addition, the robot control apparatus may not determine the candidate vector as the target vector based on the score of the candidate vector not exceeding the selected, set, or predetermined score. In this case, the robot control apparatus may determine (e.g., the operation described in operation 220) the score of a vector different from the candidate vector by identifying a vector different from the candidate vector in a selected, set, or predetermined database.

The robot control apparatus may store the input sentence and the feature vector in the database based on providing the target service to the user. For example, the robot control apparatus may store a service according to the input sentence paired with the feature vector in the database by pairing the service according to the input sentence with the feature vector. Through this operation, the robot control apparatus may manage the database.

Figure 3:
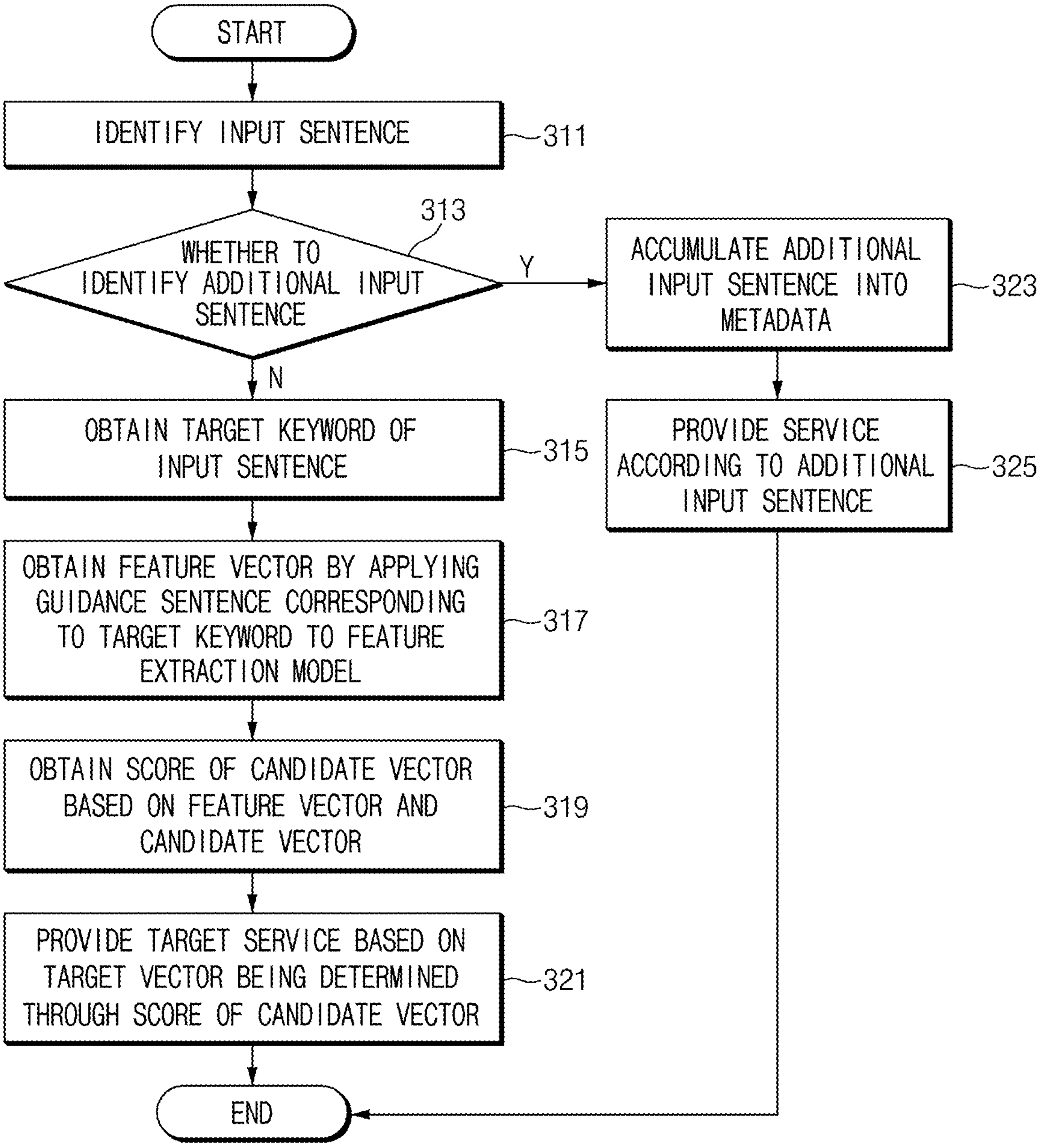
FIG. 3 is a flowchart for describing a method of providing a target service in a robot control apparatus, according to an embodiment of the present disclosure.

FIG. 3 is a flowchart for describing a method of providing a target service in a robot control apparatus, according to an embodiment of the present disclosure.

In operation 311, a robot control apparatus (e.g., the robot control apparatus 100 in FIG. 1) according to an embodiment may identify an input sentence. For example, the input sentence may include a service request for a vehicle description.

In operation 313, the robot control apparatus may determine whether to identify an additional input sentence. For example, the robot control apparatus may identify the additional input sentence different from the input sentence after identifying the input sentence in operation 311.

In operation 315, the robot control apparatus may obtain the target keyword of the input sentence based on the additional input sentence not being identified. For example, the target keyword may indicate information about the user's intent or requirements included in the input sentence. In detail, when the input sentence can include the service request regarding a vehicle description, the robot control apparatus may obtain a description as a target keyword from the input sentence through a first service table regarding synonyms mapping. The detailed method for obtaining the target keyword is described later in FIG. 4 below.

In operation 317, the robot control apparatus may obtain a feature vector by applying the guidance sentence corresponding to the target keyword to the feature extraction model. For example, the robot control apparatus may obtain a guidance sentence corresponding to the target keyword based on a second service table regarding service mapping. In detail, when the input sentence includes a service request regarding a vehicle description, and the target keyword is a description, the robot control apparatus may obtain a sentence regarding a service, which corresponds to the target keyword and which describes vehicles in an exhibition hall, as a guidance sentence based on the second service table. The detailed method for obtaining the guidance sentence is described later in FIG. 4 below.

The robot control apparatus may train a feature extraction model. For example, the feature extraction model may include a neural network. The neural network may include a plurality of layers, and each layer may include a plurality of nodes. The node may include a node value determined based on an activation function. A node on any layer may be connected to a node (e.g., another node) on another layer through a link (e.g., a connection edge) with a connection weight. The node value of a node may be propagated to other nodes through the link. In an inference operation of the neural network, node values may be forward propagated from the previous layer to the next layer.

For example, the forward propagation operation in the feature extraction model may indicate an operation of propagating node values based on input data in a direction from an input layer of the feature extraction model to an output layer of the feature extraction model. In other words, the node value of the corresponding node may be propagated (e.g., forward propagated) to a node (e.g., the next node) of the next layer connected through the node and the connection edge. For example, the node may receive a value weighted by a connection weight from the previous node (e.g., a plurality of nodes) connected through the connection edge.

The node value of a node may be determined based on applying an activation function to the sum (e.g., weighted sum) of weighted values received from previous nodes. For example, a parameter of a neural network may include the connection weight described above. The parameters of the neural network may be updated such that a value of an objective function value described later changes in a targeted direction (e.g., a direction in which a loss is minimized).

The trained feature extraction model may indicate a model trained through machine learning, and may be a trained machine learning model that outputs a training output (e.g., a feature vector of an input sentence) from a training input (e.g., a guidance sentence).

The machine learning model (e.g., the trained feature extraction model) may be created through machine learning. For example, the learning algorithm may include supervised learning, unsupervised learning, semi-supervised learning, or reinforcement learning, but may not be limited to the above example.

The machine learning model may include a plurality of artificial neural network layers. The artificial neural network may be one of a deep neural network (DNN), a convolutional neural network (CNN), U-Net for image segmentation (U-net), a recurrent neural network (RNN), a restricted Boltzmann machine (RBM), a deep belief network (DBN), a bidirectional recurrent deep neural network (BRDNN), or a deep Q-network, or at least one combination among combinations thereof, but may not be limited to the above-described examples.

In the case of supervised learning, the above-described machine learning model may be trained based on training data including pairs of a training input and a training output mapped to the training input. For example, the machine learning model may be trained to output the training output from the training input. The machine learning model during training may generate a temporary output in response to the training input, and may be trained such that the loss between the temporary output and the training output (e.g., a training target) is minimized. During a training process, a parameter (e.g., a connection weight between nodes/layers in a neural network) of the machine learning model may be updated depending on the loss. For example, this training may be performed by the robot control apparatus itself where the machine learning model is performed, and/or may be performed through a separate server. The machine learning model (e.g., the trained feature extraction model) in which training is completed may be stored in a memory (e.g., the memory 120 in FIG. 1).

In operation 319, the robot control apparatus may obtain the score of the candidate vector based on the feature vector and the candidate vector. For example, the robot control apparatus may compare the feature vector and the candidate vector. In detail, the robot control apparatus may obtain the score of the candidate vector by applying the feature vector and the candidate vector to a score calculation model, which is trained to extract a score related to similarity based on Euclidean scalar product. The operation of the Euclidean scalar product may be performed by the score calculation model (or the robot control apparatus) based on Equation 1 below.

$$\text{similarity} = \frac{\sum_{i=1}^{n} A_i \times B_i}{\sqrt{\sum_{i=1}^{n} (A_i)^2 \times \sum_{i=1}^{n} (B_i)^2}} \quad \text{[Equation 1]}$$

Here, $A_i$ may denote a feature vector; Bi may denote a candidate vector; n may denote the number of elements of each of the feature vector and the candidate vector; and similarity may denote the similarity (i.e., a value obtained by quantifying the degree of similarity between the candidate vector and the feature vector) of candidate vectors.

In operation 321, the robot control apparatus may provide a target service based on the target vector being determined through the score of the candidate vector. For example, the robot control apparatus may identify a first vector and a second vector from a database including candidate vectors. Through the method described in operation 319, the robot control apparatus may determine the score of the first vector and the score of the second vector. The robot control apparatus may identify the vector with the highest score by comparing the score of the first vector, the score of the second vector, and the score of the candidate vector. For example, when the score of the candidate vector is the highest among the score of the first vector, the score of the second vector, and the score of the candidate vector, the robot control apparatus may determine the candidate vector as the target vector. The robot control apparatus may provide the target service, which is a service according to the input sentence and which is paired with the target vector, based on the candidate vector being determined as the target vector.

In operation 323, the robot control apparatus may accumulate an additional input sentence into metadata based on identifying the additional input sentence. For example, the metadata may indicate data stored in a database. Afterward, in operation 325, the robot control apparatus may provide the service according to the additional input sentence.

In detail, after identifying the input sentence, the robot control apparatus may obtain an additional feature vector from the additional input sentence based on identifying the additional input sentence including additional requirements of the user. The robot control apparatus may obtain the score of the candidate vector based on the additional feature vector and the candidate vector. The robot control apparatus may provide the service, which is paired with a target vector and which is according to the additional input sentence, based on the target vector being determined through the score of the candidate vector.

Figure 4:
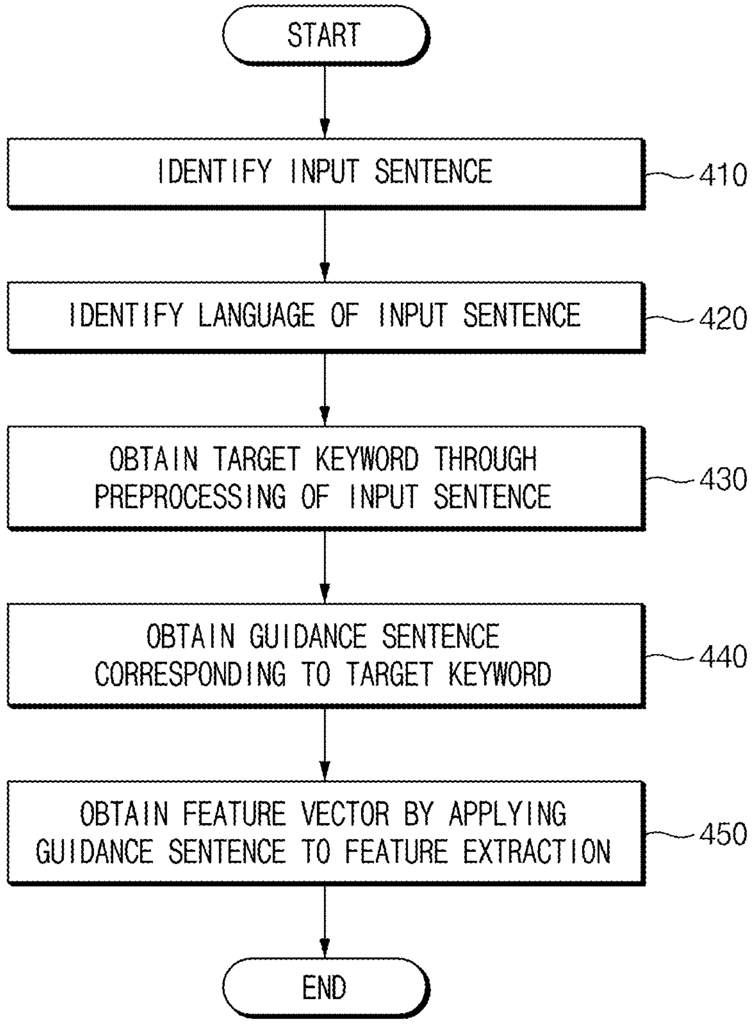
FIG. 4 is a flowchart for describing a method of obtaining a feature vector to provide a target service from an input sentence in a robot control apparatus, according to an embodiment of the present disclosure.

FIG. 4 is a flowchart for describing a method of obtaining a feature vector to provide a target service from an input sentence in a robot control apparatus, according to an embodiment of the present disclosure.

In operation 410, a robot control apparatus (e.g., the robot control apparatus 100 in FIG. 1) according to an embodiment may identify an input sentence. However, an embodiment is not limited thereto. The robot control apparatus may identify a target including a user's requirements, including at least one of an input sentence, or a voice, or any combination thereof. Accordingly, for convenience of description in this specification, the identification performed by the robot control apparatus to provide a service to the user is described by identifying the input sentence.

In operation 420, the robot control apparatus may identify a language of the input sentence. For example, the robot control apparatus may translate the language of the input sentence by translating the language of the input sentence into a target language based on the language of the input sentence not being one of the predetermined target languages (e.g., English). The robot control apparatus may improve the accuracy of a guidance service by translating the language of the input sentence into the target language.

In operation 430, the robot control apparatus may obtain a target keyword through preprocessing of the input sentence. The input sentence may indicate a sentence translated into a sentence in the target language. In detail, the robot control apparatus may obtain at least one keyword from the input sentence by removing a stopword of the input sentence. For example, the robot control apparatus may obtain keyword 'describe' and keyword 'car' by removing stopword 'about' from an input sentence such as 'describe about car'.

The robot control apparatus may obtain the target keyword of the input sentence based on at least one keyword and a first service table regarding synonyms mapping. For example, the first service table may include content as described in Table 1 below.

TABLE 1

| ID | VALUE |
|---|---|
| Explain | 1 |
| Escort | 2 |
| Guide | 3 |
| Toilet | 3 |
| desk | 2 |

For example, the robot control apparatus may determine the target keyword of the input sentence as 'explain' based on keyword 'describe', keyword 'car', and the first service table.

In operation 440, the robot control apparatus may obtain a guidance sentence corresponding to the target keyword with reference to a second service table regarding service mapping based on determining the target keyword of the input sentence. For example, the second service table may include content as described in Table 2 below.

TABLE 2

| ID | VALUE |
|---|---|
| 1 | Service for explaining vehicles in exhibition hall |
| 2 | Service for providing guidance and moving to place within exhibition hall. |
| 3 | Service for providing information about available facilities in building |
| 4 | Service for taking pictures |
| 5 | Service for comparing vehicles in vehicle store to purchase vehicle |

For example, the robot control apparatus may obtain the guidance sentence corresponding to the target keyword as 'service for explaining vehicles in an exhibition hall' through the second service table based on the fact that 'explain' is determined as the target keyword and a value of the target keyword in Table 1 is '1'.

In operation 450, the robot control apparatus may obtain a feature vector by applying the guidance sentence (e.g., the 'service for explaining vehicles in the exhibition hall') to a feature extraction model trained to extract features of the sentence.

Figure 5:
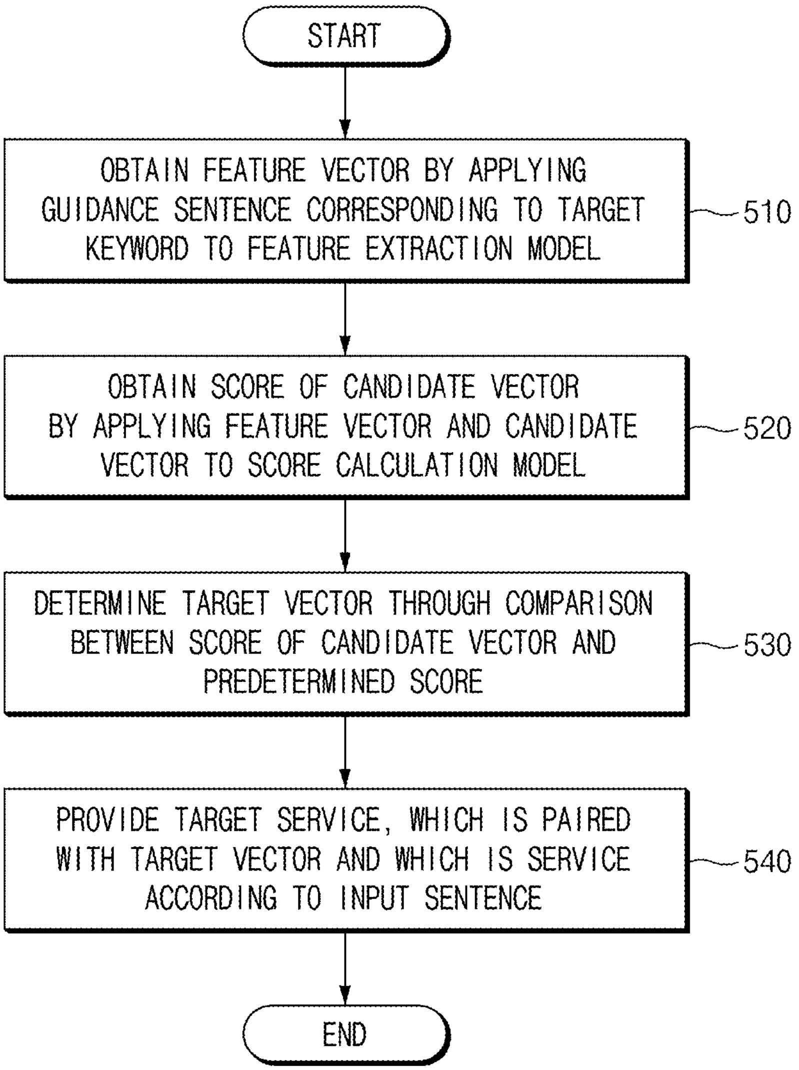
FIG. 5 is a flowchart for describing a method of providing a target service from a feature vector in a robot control apparatus, according to an embodiment of the present disclosure.

FIG. 5 is a flowchart for describing a method of providing a target service from a feature vector in a robot control apparatus, according to an embodiment of the present disclosure.

In operation 510, a robot control apparatus (e.g., the robot control apparatus 100 in FIG. 1) according to an embodiment may obtain a feature vector by applying a guidance sentence corresponding to a target keyword to a feature extraction model. The detailed description of obtaining the feature vector is described in FIG. 4, and thus it may be omitted in FIG. 5.

In operation 520, the robot control apparatus may obtain the score of a candidate vector by applying the feature vector and the candidate vector to a score calculation model. The score calculation model may indicate a model trained to calculate the score of a candidate vector, based on the operation described in Equation 1, for example.

In operation 530, the robot control apparatus may determine the target vector through a comparison between the score of the candidate vector and the selected, set, or predetermined score. The robot control apparatus may identify at least one vector from a database in which a candidate vector is stored. The robot control apparatus may obtain the score of at least one vector based on a feature vector and the at least one vector. The robot control apparatus may determine the target vector based on the score of at least one vector and the selected, set, or predetermined score.

In operation 540, the robot control apparatus may provide a target service, which is paired with the target vector and which is a service according to the input sentence. For example, the robot control apparatus may determine an output vector group, which exceeds the selected, set, or predetermined score and which includes the target vector, by comparing the score of at least one vector with the selected, set, or predetermined score. A service paired with a vector included in an output vector group may indicate a service suitable for resolving the user's requirements included in the input sentence. The robot control apparatus may provide a service according to the input sentence by providing the service paired with each vector included in the output vector group.

Figure 6:
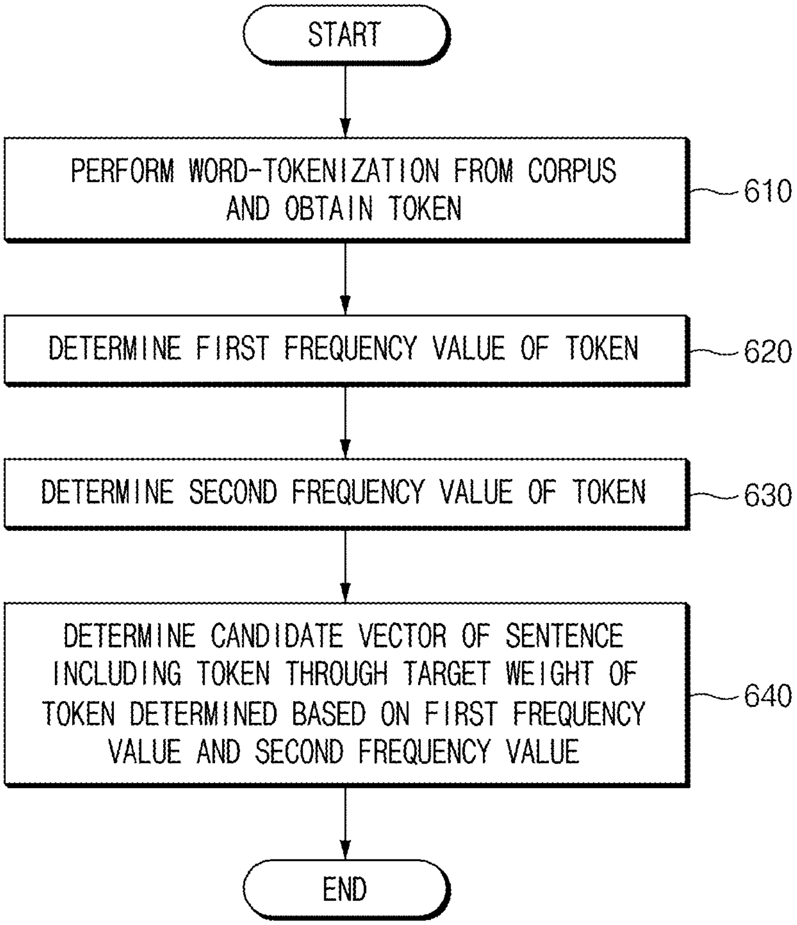
FIG. 6 is a flowchart illustrating a method for determining a candidate vector stored in a database in a robot control apparatus, according to an embodiment of the present disclosure.

FIG. 6 is a flowchart illustrating a method for determining a candidate vector stored in a database in a robot control apparatus, according to an embodiment of the present disclosure.

In operation 610, a robot control apparatus (e.g., the robot control apparatus 100 in FIG. 1) according to an embodiment may perform word-tokenization from a corpus to determine a candidate vector stored in a database and may obtain a token. For example, the robot control apparatus may obtain the token by performing word-tokenization from the corpus including documents including at least one sentence. In other words, the token may indicate words included in the sentence.

In operation 620, the robot control apparatus may determine a first frequency value of the token. For example, the robot control apparatus may determine the first frequency value of the token regarding a term frequency, at which the token is included in the corpus, based on the corpus.

At operation 630, the robot control apparatus may determine a second frequency value of the token. For example, the robot control apparatus may determine the second frequency value of the token regarding an inverse document frequency, at which the token is included in documents, based on the corpus. The second frequency value may be determined based on Equation 2 below.

$$IDF(w) = \log\frac{N}{DF(w)} \quad \text{[Equation 2]}$$

Here, N may denote the total number of documents; DF(w) may denote the first frequency value of the calculated token w; and, IDF(w) may denote the second frequency value of the calculated token w.

In operation 640, the robot control apparatus may determine a candidate vector of the sentence including the token through a target weight of the token determined based on the first frequency value and the second frequency value. The target weight may be determined based on the first frequency value and the second frequency value. For example, the robot control apparatus may determine the target weight based on the sum of the first frequency value and the second frequency value, but is not limited thereto. The robot control apparatus may determine the vector of sentences, which are included in a database and which are different from sentences of the candidate vector, based on determining the candidate vector of the sentence including the token.

Figure 7:
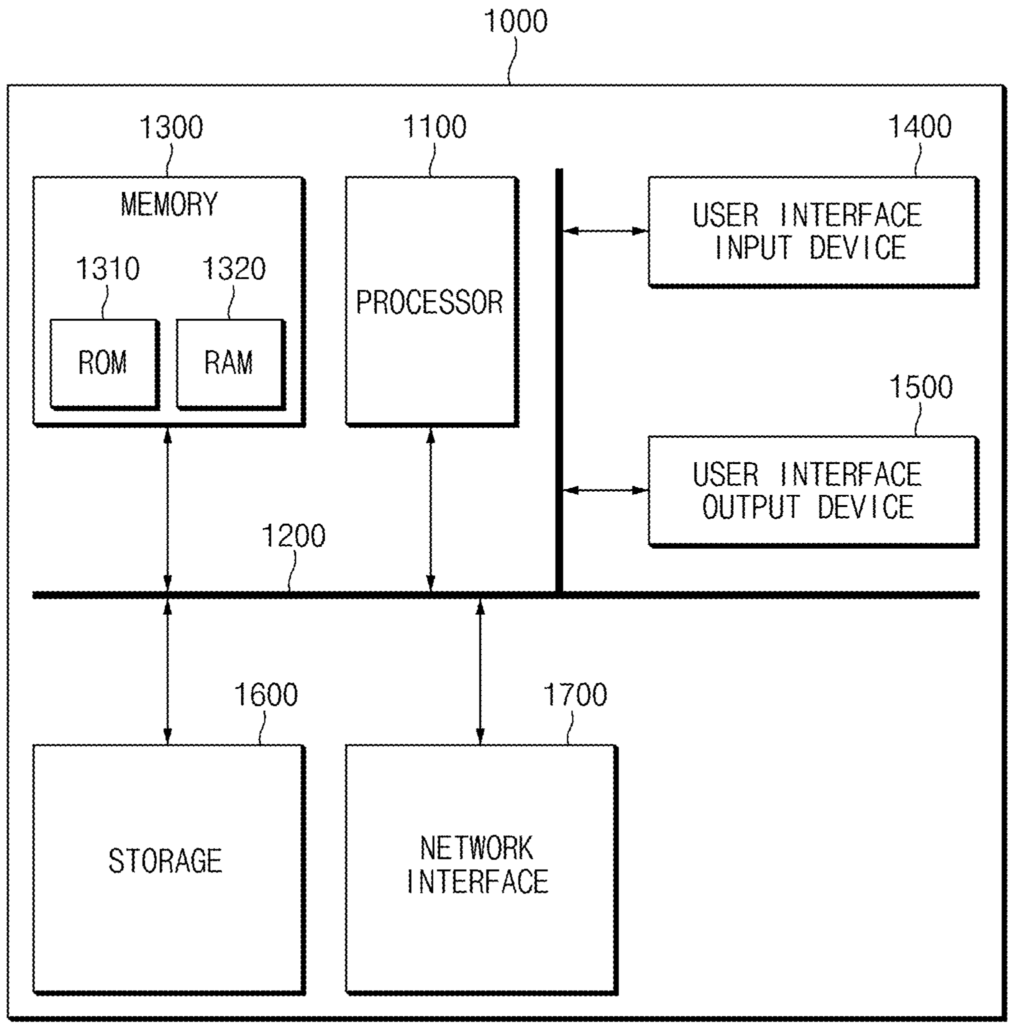
FIG. 7 is a diagram illustrating a computing system related to a robot control apparatus or a robot control method, according to an embodiment of the present disclosure.

FIG. 7 is a diagram illustrating a computing system related to a robot control apparatus or a robot control method, according to an embodiment of the present disclosure.

Referring to FIG. 7, a computing system 1000 related to a robot control apparatus or a robot control method may include at least one processor 1100, a memory 1300, a user interface input device 1400, a user interface output device 1500, a storage 1600, and a network interface 1700, which are connected with each other via a bus 1200, any combination of or all of which may be in plural or may include plural components thereof.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and/or a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM), or any combination thereof.

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of technical ideas of the present disclosure, and various modifications and modifications may be made by one skilled in the art without departing from scopes and essential characteristics of the present disclosure.

The above-described embodiments may be implemented with hardware elements, software elements, and/or a combination of hardware elements and software elements. For example, the devices, methods, and components described in embodiments of the present disclosure may be implemented by using general-use computers or special-purpose computers, such as a processor, a controller, an arithmetic logic unit (ALU), a digital signal processor, a microcomputer, a field programmable array (FPA), a programmable logic unit (PLU), a microprocessor, or any device which may execute instructions and respond. A processing device may perform an operating system (OS) or a software application running on the OS. Further, the processing device may access, store, manipulate, process, and generate data in response to execution of software. It can be understood by those skilled in the art that although a single processing device may be illustrated for convenience of understanding, the processing device may include a plurality of processing elements and/or a plurality of types of processing elements (together, separated, and/or remote). For example, the processing device may include a plurality of processors or one processor and one controller. Also, the processing device may include a different processing configuration, such as a parallel processor.

Software may include computer programs, codes, instructions or one or more combinations thereof and configure a processing device to operate in a desired manner or independently or collectively control the processing device. Software and/or data may be permanently or temporarily embodied in any type of machine, components, physical equipment, virtual equipment, computer storage media or units or transmitted signal waves so as to be interpreted by the processing device or to provide instructions or data to the processing device. Software may be dispersed throughout computer systems connected over networks and be stored or executed in a dispersion manner or distributed or blockchain or any combination thereof, for example. Software and data may be recorded in a computer-readable storage medium.

The methods according to the above-described embodiments may be recorded in a computer-readable medium including program instructions that are executable through various computer devices. The computer-readable medium may also include program instructions, data files, data structures, or a combination thereof. The program instructions recorded in the medium may be designed and configured specially for the embodiments of the present disclosure or may be partially known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories, for example. Examples of computer programs include not only machine language codes created by a compiler, but also high-level language codes that are capable of being executed by a computer by using an interpreter or the like.

The hardware device described above may be configured to act as one or more software modules to perform the operations of the above-described exemplary embodiments of the present disclosure, or vice versa.

Even though example embodiments are described with reference to restricted drawings, it may be apparent to one skilled in the art that the embodiments can be variously changed or modified based on the above description. For example, adequate effects may be achieved even when the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims can be within scopes of the following claims.

Accordingly, example embodiments of the present disclosure are intended not to limit but to explain technical ideas of the present disclosure, and the scopes and spirit of the present disclosure are not necessarily limited by the above example embodiments. The scope of protection of the present disclosure can be construed by the attached claims, and all equivalents thereof can be construed as being included within the scopes of the present disclosure.

Descriptions of a robot control apparatus according to an embodiment of the present disclosure, and a control method thereof are as follows.

According to at least one of embodiments of the present disclosure, it can be possible to provide a user with personalized guidance and to increase the user's convenience by providing a target service through a target vector determined from an input sentence including the user's requirements.

Moreover, according to at least one of embodiments of the present disclosure, it can be possible to increase the accuracy of an operation of providing the user with personalized guidance by translating the language of an input sentence into a target language based on the language of the input sentence not being an available or predetermined target language.

Furthermore, according to at least one of embodiments of the present disclosure, it can be possible to manage data through a standardized policy in a database by determining a candidate vector of a sentence including a token based on a first frequency value of the token and a second frequency value of the token, which can be obtained from a corpus.

A variety of effects directly or indirectly understood through the present disclosure may be provided.

Hereinabove, although the present disclosure was described with reference to example embodiments and the accompanying drawings, the present disclosure is not necessarily limited thereto, but may be variously modified and altered by those skilled in the art to which the present disclosure pertains without departing from the spirit and scopes of the present disclosure claimed in the following claims.

What is claimed is:

1. A robot control apparatus comprising:
- at least one processor; and
- a storage medium storing computer-readable instructions that, when executed by the at least one processor, enable the at least one processor to:
  - obtain a feature vector for providing a target service to a user according to an input sentence based on identifying the input sentence including requirements of the user;
  - obtain a candidate score of a candidate vector based on the feature vector and the candidate vector stored in a database, wherein the at least one processor being enabled to determine the candidate vector stored in the database comprises the at least one processor being enabled to:
    - obtain a token by performing word-tokenization from a corpus including documents that each include at least one sentence;
    - determine a first frequency value of the token regarding a term frequency, at which the token is included in the corpus;
    - determine a second frequency value of the token regarding an inverse document frequency, at which the token is included in the documents;
    - determine a target weight of the token based on the first frequency value and the second frequency value; and
    - determine the candidate vector of a given sentence including the token based on the target weight of the token; and
  - provide the target service that is paired with a target vector and that includes a specific service according to the input sentence, based on the target vector being determined through the candidate score of the candidate vector.

2. The apparatus of claim 1, wherein the instructions further enable the at least one processor to:

translate an input language of the input sentence by translating the input language of the input sentence into a target language in response to the input language of the input sentence not being the target language;

obtain at least one input sentence keyword from the input sentence by removing a stopword of the input sentence; and obtain a target keyword of the input sentence from a first service table based on the at least one input sentence keyword and the first service table regarding synonyms mapping.

3. The apparatus of claim 2, wherein the instructions further enable the at least one processor to:

obtain a guidance sentence corresponding to the target keyword based on a second service table regarding service mapping; and obtain the feature vector by applying the guidance sentence to a feature extraction model trained to extract a feature of a given sentence.

4. The apparatus of claim 1, wherein the instructions further enable the at least one processor to obtain the candidate score of the candidate vector by applying the feature vector and the candidate vector to a score calculation model, wherein the score calculation model is trained to extract a similarity score related to similarity based on Euclidean scalar product.

5. The apparatus of claim 1, wherein the instructions further enable the at least one processor to:

identify at least one database vector from the database in which the candidate vector is stored;

obtain a database vector score of the at least one database vector based on the feature vector and the at least one database vector; and determine the target vector based on the database vector score of the at least one database vector and a threshold score.

6. The apparatus of claim 5, wherein the instructions further enable the at least one processor to:

determine an output vector group that exceeds the threshold score and that includes the target vector, by comparing the database vector score of the at least one database vector with the threshold score; and provide a vector-related service paired with each vector included in the output vector group.

7. The apparatus of claim 1, wherein the instructions further enable the at least one processor to:

obtain an additional feature vector from an additional input sentence based on identifying the additional input sentence including additional requirements of the user after identifying the input sentence;

obtain the candidate score of the candidate vector based on the additional feature vector and the candidate vector; and provide a vector-related service that is paired with the target vector and that is according to the additional input sentence, based on the target vector being determined through the candidate score of the candidate vector.

8. The apparatus of claim 1, wherein the instructions further enable the at least one processor to store a vector-related service that is paired with the feature vector and that is according to the input sentence, in the database by pairing the vector-related service according to the input sentence with the feature vector.

9. A robot control method, the method comprising:

obtaining a feature vector for providing a target service to a user according to an input sentence based on identifying the input sentence including requirements of the user;

obtaining a candidate score of a candidate vector based on the feature vector and the candidate vector stored in a database, wherein determining the candidate vector stored in the database comprises:

obtaining a token by performing word-tokenization from a corpus including documents that each include at least one sentence;

determining a first frequency value of the token regarding a term frequency, at which the token is included in the corpus;

determining a second frequency value of the token regarding an inverse document frequency, at which the token is included in the documents;

determining a target weight of the token based on the first frequency value and the second frequency value; and determining the candidate vector of a given sentence including the token based on the target weight of the token; and providing the target service that is paired with a target vector and that includes a specific service according to the input sentence, based on the target vector being determined through the candidate score of the candidate vector.

10. The method of claim 9, wherein the obtaining of the feature vector includes:

translating an input language of the input sentence by translating the input language of the input sentence into a target language in response to the input language of the input sentence not being the target language;

obtaining at least one input sentence keyword from the input sentence by removing a stopword of the input sentence; and obtaining a target keyword of the input sentence from a first service table based on the at least one input sentence keyword and the first service table regarding synonyms mapping.

11. The method of claim 10, wherein the obtaining of the feature vector includes:

obtaining a guidance sentence corresponding to the target keyword based on a second service table regarding service mapping; and obtaining the feature vector by applying the guidance sentence to a feature extraction model trained to extract a feature of a given sentence.

12. The method of claim 9, wherein the obtaining of the candidate score of the candidate vector includes obtaining the candidate score of the candidate vector by applying the feature vector and the candidate vector to a score calculation model, wherein the score calculation model is trained to extract a similarity score related to similarity based on Euclidean scalar product.

13. The method of claim 9, wherein the providing of the target service includes:

identifying at least one database vector from the database in which the candidate vector is stored;

obtaining a database vector score of the at least one database vector based on the feature vector and the at least one database vector; and determining the target vector based on the database vector score of the at least one database vector and a threshold score.

14. The method of claim 13, wherein the providing of the target service includes:

determining an output vector group that exceeds the threshold score and that includes the target vector, by comparing the database vector score of the at least one database vector with the threshold score; and providing a vector-related service paired with each vector included in the output vector group.

15. The method of claim 9, wherein the providing of the target service includes:

obtaining an additional feature vector from an additional input sentence based on identifying the additional input sentence including additional requirements of the user after identifying the input sentence;

obtaining the candidate score of the candidate vector based on the additional feature vector and the candidate vector; and providing a vector-related service that is paired with the target vector and that is according to the additional input sentence, based on the target vector being determined through the candidate score of the candidate vector.

16. The method of claim 9, wherein the providing of the target service includes storing a vector-related service that is paired with the feature vector and that is according to the input sentence, in the database by pairing the vector-related service according to the input sentence with the feature vector.

17. A robot control method, the method comprising:

translating an input language of an input sentence from a user by translating the input language of the input sentence into a target language in response to the input language of the input sentence not being the target language;

obtaining a feature vector for providing a target service to the user according to the input sentence based on identifying the input sentence including requirements of the user;

obtaining a candidate score of a candidate vector by applying the feature vector and the candidate vector to a score calculation model, wherein the score calculation model is trained to extract a similarity score related to similarity based on Euclidean scalar product, and wherein determining the candidate vector comprises:

obtaining a token by performing word-tokenization from a corpus including documents that each include at least one sentence;

determining a first frequency value of the token regarding a term frequency, at which the token is included in the corpus;

determining a second frequency value of the token regarding an inverse document frequency, at which the token is included in the documents;

determining a target weight of the token based on the first frequency value and the second frequency value; and determining the candidate vector of a given sentence including the token based on the target weight of the token; and providing the target service that is paired with a target vector and that includes a specific service according to the input sentence, based on the target vector being determined through the candidate score of the candidate vector.

18. The method of claim 17, wherein the providing of the target service includes:

identifying at least one database vector from the database in which the candidate vector is stored;

obtaining a database vector score of the at least one database vector based on the feature vector and the at least one database vector;

determining the target vector based on the database vector score of the at least one database vector and a threshold score;

determining an output vector group that exceeds the threshold score and that includes the target vector, by comparing the database vector score of the at least one database vector with the threshold score; and providing a vector-related service paired with each vector included in the output vector group.

19. The method of claim 17, wherein the obtaining of the feature vector includes obtaining at least one input sentence keyword from the input sentence by removing a stopword of the input sentence, and obtaining a target keyword based on at least one input sentence keyword and a first service table regarding synonyms mapping.

20. The method of claim 17, further comprising storing a service that is paired with the feature vector and that is according to the input sentence, in a database by pairing a vector-related service according to the input sentence with the feature vector.

* * * * *